United States Patent Office 3,479,431
Patented Nov. 18, 1969

3,479,431
FUNGICIDAL COMPOSITION CONTAINING THE Ba-SALTS OF PHENOL AND CHLORINATED PHENOLS
Yasumori Momotari, Miyagi-ken, Japan, assignor to Tohoku Kyodo Kagakukogyo Kabushiki Kaisha, Miyagi-ken, Japan
No Drawing. Filed Dec. 24, 1963, Ser. No. 333,181
Int. Cl. A01n 9/26
U.S. Cl. 424—159                4 Claims

ABSTRACT OF THE DISCLOSURE

A composition which is effective as an insecticide, fungicide, and weed killer and is constituted by a Ba-salt of phenol or chlorinated phenol, a mixture of rosin and rosin alkali soap in an amount between 0.5 and 5 times the Ba-salt, and a carrier consisting essentially of slaked lime.

This invention relates to compositions for agricultural use, and more particularly to compositions for agricultural use consisting of Ba-salts of chlorinated phenols and Ba-salt of phenol.

It is known that, chlorinated phenols, phenol and/or metallic salts thereof are relatively stable against heat, acid and alkali, but they lack continuation of effectiveness, when used in the open-air as an antiseptic, a bactericide, an insecticide, weed-killers, etc.

As a result of observation of this phenomenon, the inventor has found that this occurs generally according to the respective natures of said compounds as well as particularly by decomposition by the action of photochemical oxidation that is, said compounds are easily and quickly decomposed by ultraviolet rays and such decomposing action by ultraviolet rays occurs more violently, if water, iron and other materials co-exist therein.

After research on the basis of this phenomenon, the inventor has discovered the fact that among metallic salts of chlorinated phenols and phenol, Ba-salts thereof are most effective in fungitoxicity, and that compositions consisting of one of Ba-salts of the chlorinated phenols or Ba-salt of phenol (hereinafter called "Ba-salts of phenols"), a mixture of rosin and rosin alkali soap which is used as an agent for the purpose of preventing photo-chemical decomposition by ultraviolet rays (hereinafter called "rosin mixture"), and a carrier mainly consisting of slaked lime, have an effectiveness to fully meet the purpose of use, and continue such effectiveness at the first stage and remarkably reduce injuries. As the rosin mixture, partially saponified rosin may be used.

It is, therefore, an object of the invention to provide stable compositions for agricultural use which consist of, at least, one of the Ba-salts of phenols, a rosin mixture and a carrier consisting mainly of slaked lime.

It is another object of the invention to provide stable compositions for agricultural use which are protected against decomposition by ultraviolet rays.

It is still another object of the invention to provide stable compositions for agricultural use which are less injurious to rice and other useful plants as well as to fish, shell-fish and the like.

Other objects and advantages of the invention will be apparent from the following description, especially from the various examples:

The composition of this invention is mainly utilized as agricultural fungicides and is preferably used in the form of a powder. An example of the preparation thereof is illustrated as follows:

Fine powder of Ba-salts of phenols is blended with a paste-like rosin mixture and methanol or methyl-ethyl-ketone, etc. and is kneaded, volatilized, left to be cooled, solidified and then pulverized. In another way, the fine powder of the Ba-salts of phenols is blended into the molten rosin-mixture, left to be cooled, solidified and then pulverized. On this occasion, addition of a small amount of pine oil, camphor oil, etc. will faciliate the kneading. Fine powder thus obtained is well mixed with a proper quantity of fine powder chiefly consisting of slaked lime as a carrier. The effective ratio of the rosin mixture is more than 0.5 and less than 5 times by weight of the Ba-salts of phenols. Technically and economically, an amount in the range of 1.5 to 3 times is most preferable. The ratio of soap occupied in the rosin mixture is 10 to 60%.

As the Ba-salts of phenols of this invention, at least, one selected from the following group is used: Ba-salts of chlorophenols, such as pentachlorophenol, tetrachlorophenol, dichlorophenol, monochlorophenol, 2-chloro-4-phenylphenol and the Ba-salt of phenol itself. Among these, the Ba-salt of pentachlorophenol has shown the most remarkable effects. Concentration of effective components in the present compositions may be preferably employed in the range of 1 to 6% according to the respective kinds of the Ba-salts of phenols.

As a result of experiments of the effect of the rosin mixture, blended with the Ba-salt of phenol in connection with, for instance, the inhibition effect on the spore germination of rice blash-fungus shows as follows:

When ultraviolet rays irradiate the Ba-salt of pentachlorophenol, which is merely mixed with the slaked lime (and without the rosin mixture) and powdered, the Ba-salt is easily decomposed. On the other hand, however, the Ba-salt with the rosin mixture shows that the effectiveness at the first-stage will continue, and consequently, has practical use, compared with "Ca-Ceresan" powder, a mercury agency.

Similar effects are obtained against the sheath blight of rice, snow blight of wheat, etc. (Refer to the experimental results listed below.)

Further, in the case of the Ba-salts of lower chlorinated phenols and the Ba-salt of phenol, their inhibition effect on the spore germination of rice blast-fungus are low, and moreover, they are easily decomposed by photochemical oxidation. Accordingly, it is difficult to put them to practical use. However, when the rosin mixture is blended thereinto, they prevent photochemical oxidation and continue their effectiveness at the first stage. Accordingly, they have practical use.

Such advantage in this invention is obtained to some degree by the blending of rosin only, but it is not satisfactory. In the case of the use of the material in which rosin was completely saponified, such effect is not produced. It is presumed, therefore, that the reason why the rosin mixture is particularly effective is that the rosin soap physically promotes dispersion and spread of its main component and rosin.

The effects of the present invention are specifically explained in the experimental examples, as follows:

(1) EXPERIMENT OF INHIBITION EFFECT ON SPORE GERMINATION OF RICE BLAST (1) Method An ultraviolet ray irradiation lamp (2573A) was hung in the center of an ultraviolet ray irradiation box, making the irradiation distance 25 cm. The temperature in the box was maintained at 24 to 25° C. The test material diluted 100 times by water, was dropped over one Pt-loop (of 5 mm. inner dia.) on a round filter paper of 8 mm. dia. and irradiated with ultraviolet rays for 96, 72, 48, and 24 hours in this state. Successively using spores formed on acute lesion, there were dropped by on Pt-loop on said filter paper the spore suspension, spore concentration of which is about 30 at one Pt-loop (one sight enlarged by 150 times). The box was placed in a damp room, and kept at 27° C. and, after 7 hours, the ratio of inhibition effect on the germination was determined. As test material, various kinds of compositions in the form of powder prepared by the method of Example I and other similar methods were used. The result thereof is shown in the following table:

with a carrier chiefly consisting of slaked lime into said effective compounds, the abovementioned defects are eliminated. It is essential that the chief component of the composition of the carrier is slaked lime, and, for example, in the case of Ba-salt of pentachlorophenol, in order to prevent injury, it is desirable to make the rate of carrier occupied in the composition more than 85% thereof.

In this case, if a part (for instance, about 10%) of

| | | Constitutents | | | Inhibition ratio on spore germination of rice blast-fungus after irradiation by ultraviolet rays | | | |
|---|---|---|---|---|---|---|---|---|
| Kinds of Ba-salt of Phenols | | Ba-salt content, percent | Rosin content, percent | Soap content, percent | Carrier, percent | After 24 hrs. | After 48 hrs. | After 72 hrs. | After 96 hrs. |
| 1 | Ba-salt of pentachlorophenol | 1 | 0 | 0 | 99 | 50.3 | 50.0 | 21.7 | 19.3 |
| 2 | | 1 | 0 | 1 | 98 | 40.2 | 24.1 | 18.8 | 17.9 |
| 3 | | 1 | 0.5 | 0 | 98.5 | 85.0 | 79.5 | 50.1 | 43.5 |
| 4 | | 1 | 1 | 0 | 98 | 91.6 | 84.7 | 76.8 | 56.0 |
| 5 | | 1 | 0.5 | 0.05 | 98.45 | 98.0 | 86.7 | 77.5 | 53.6 |
| 6 | | 1 | 0.5 | 0.1 | 98.4 | 98.0 | 86.5 | 80.5 | 68.4 |
| 7 | | 1 | 1 | 0.2 | 97.8 | 97.4 | 87.5 | 83.5 | 75.6 |
| 8 | | 1 | 1 | 1 | 97 | 98.9 | 85.5 | 82.0 | 76.2 |
| 9 | | 1 | 2 | 2 | 95 | 98.2 | 92.2 | 89.3 | 79.5 |
| 10 | Ba-salt of 2,3,4,6-tetrachloro-phenol | 2 | 0 | 0 | 98 | 43.8 | 41.4 | 40.7 | 39.5 |
| 11 | | 2 | 2 | 2 | 94 | 87.0 | 84.4 | 81.7 | 56.4 |
| 12 | Ba-salt of 2,4,6-trichloro-phenol | 3 | 0 | 0 | 97 | 44.2 | 38.0 | 32.0 | 20.9 |
| 13 | | 3 | 3 | 3 | 91 | 87.0 | 82.6 | 80.3 | 80.2 |
| 14 | Ba-salt of 2,4-dichlorophenol | 3 | 0 | 0 | 97 | 34.2 | 32.0 | 23.5 | 22.2 |
| 15 | | 3 | 3 | 3 | 91 | 98.2 | 97.6 | 93.0 | 88.9 |
| 16 | Ba-salt of monochlorophenol | 3 | 0 | 0 | 97 | 62.6 | 58.2 | 57.3 | 56.1 |
| 17 | | 3 | 3 | 3 | 91 | 97.4 | 95.3 | 94.7 | 74.1 |
| 18 | Ba-salt of 2-chloro-4-phenyl phenol | 2 | 0 | 0 | 98 | 28.1 | 26.1 | 23.8 | 15.3 |
| 19 | | 2 | 2 | 2 | 94 | 86.0 | 76.6 | 67.4 | 59.5 |
| 20 | Ba-salt of phenol | 3 | 0 | 0 | 97 | 38.0 | 31.0 | 25.5 | 18.2 |
| 21 | | 3 | 1.5 | 1.5 | 94 | 98.2 | 95.3 | 87.5 | 63.2 |
| 22 | Ca-Ceresan powder (mercury powder) (Hg 0.25%). | | | | | 95.0 | 90.8 | 80.0 | 73.0 |

(2) PREVENTION TEST OF RICE SHEATH BLIGHT (1) Method of test

Cultivation method of test plants—
Varieties: Chokai
Manuring: Usual method of this district
Dusting time:
Period of early Primordia formation (once)
Foot stage (once)
Dusting volume: 3 kg. per 10 a.

(2) Test result slaked lime is replaced for clay, talc, etc., no change in the reduction of injury occurs. Experimental results are shown as follows:

(1) TEST OF INJURY ON RICE (1) Method

Test was made, in a warm-room, by dusting on the surface of leaves of rice in a pot. Seeds of rice, "Norin No. 17," were sewn in the pot (of 1/5,000 a.), at the 6–7 leaves period, the powder of about 3 kg./10 a. was dusted on the surface of the leaves and after ten days, the degree of injury was examined.

| Chemicals | Number of tested plant | Number of culm | Number of diseased culm | Percentage of diseased culm | Injury |
|---|---|---|---|---|---|
| PCP-Ba (2.5%) dust (PCP-Ba: Rosin Mixt.) 1 : 1.5 | 48 | 754 | 208 | 26.2 | None |
| Control (not dusting) | 48 | 749 | 452 | 60.5 | |

(3) PREVENTION TEST OF SNOW BLIGHT OF WHEAT (1) Method of test

Cultivation method of test plants—
Varieties: Higashiyama No. 1 (barley)
Manuring: Usual method of this district by Pythium sp. and Fusarium sp.
Dusting: Before snow once
Dusting volume: 3 kg. per 10 a.
Investigating: After three months (2) Experimental result Compositions: Withered ratio (percent)
PCP-Ba (2.5%) dust ---------------------------------- 5
(PCP-Ba: Rosin mixt.)
  1: 1.5
"Ca Ceresan" (Hg 0.25) ------------------------------ 90
Control (not dusting) ------------------------------- 98

The use of Ba-salts of higher chlorinated phenols, such as Ba-salt of pentachlorophenol, Ba-salt of tetrachlorophenol, etc., as effective components of the composition, is very effective for fungicide, but on the other hand, it has an adverse effect on useful animals and plants. In the present invention, by means of blending the rosin mixture (2) Test result Compositions: Degree of injury
PCP-Ba (2.5%)+clay -------------------------------- ++
PCP-Ba (2.5%)+slaked lime ------------------------- +
PCP-Ba (2.5%)+rosin/soap+clay --------------------- +
  (4 : 1)
PCP-Ba (2.5%)+rosin/soap+clay/slaked lime --------- ±
  (4 : 1)   (1 :1)
PCP-Ba (2.5%)+rosin/soap+slaked lime -------------- —
  (4 : 1)

Remarks:
++: Spindle type brown spots were scattered, and irregular blotches were seen in a part or all of the leaves, and finally, withered.
+: Spindle type brown spots were scattered, but there was no such block of them as to form irregular boltches.
±: Spindle type brown spots were scattered, but few in number and were very small.
—: No brown spot.

(2) VIRULENCE TO FRESH-WATER FISH (1) Method (a) 10 goldfish were accommodated in 3 l. of test water, and after 0.5, 2, 3, 6 and 24 hours respectively, the number of dead fish were examined each time.
(b) Sizes of the goldfish tested:
  Length: 3.7 to 5.3 cm.
  Weight: 2.7 to 4.7 g.
(c) Water temperature: 12.5 to 17.3° C.
(d) Test water was prepared just before testing (2) Test result Compositions:                   24 hrs. $LD_{50}$ concentration, p.p.m.

PCP-Ba (2.5%)+rosin mixture+clay _____ 20
    (1   : 1.5)
PCP-Ba (2.5%)+rosin mixture+slaked lime _____ 30
    (1   : 1.5)

As a result of the above tests, it was clarified that the compositions of this invention continued their effectiveness long after the first stage without decrease over a lapse of time and that injury and virulence to useful animals and plants were reduced.

The manner of carrying out this invention is explained as follows:

*Example 1.*—20 parts of Ba-salt of pentachlorophenol in the form of fine powder are mixed with 60 parts of rosin and 20 parts of rosin soap saponified by $Na_2CO_3$, and melted and kneaded at 100 to 120° C. (In this case, if 3 parts of camphor oil are added, the kneading becomes easier.) After kneading, the mixture thus obtained is left to be cooled, solidified and pulverized. 5 parts of the fine powder thus obtained are mixed with 95 parts of slaked lime, thereby yielding a powder containing about 1% of Ba-salt of pentachlorophenol.

*Example 2.*—40 parts of Ba-salt pentachlorophenol in the form of fine powder, 45 parts of rosin and 15 parts of rosin soap saponified by $Na_2CO_3$ are mixed, and made into a paste by heating, there is then added a proper amount of methanol, and the mixture is well kneaded at about 50° C. after which the methanol is removed, and the mixture solidified, left to be cooled and then pulverized. 5 parts of the fine powder thus obtained are mixed with 95 parts of fine powder of slaked lime, thereby producing a powder containing about 2% of Ba-salt of pentachlorophenol.

*Example 3.*—40 parts of Ba-salt of pentachlorophenol in the form of fine powder were mixed with 60 parts of rosin about 50% partially saponified by $Na_2CO_3$, and melted and kneaded at 100 to 120° C. (In this case, if 5 parts of sesquiterpene is poured at the appropriate time during kneading, the kneading becomes easier.) The thus obtained material is left to be cooled, solidified and pulverized, and then 6.3 parts of thus obtained fine powder are mixed with 937 parts of powder slaked lime, and pulverized, thereby producing a powder containing about 2.5% of Ba-salt of pentachlorophenol.

*Example 5.*—10 parts of rosin soap saponified by $Na_2CO_3$ and 90 parts of rosin are mixed, and melted and kneaded at about 100° C. Next, 25 parts of Ba-salt of pentachlorophenol in the form of a fine powder heated to about 120° C. are added to 75 parts of the rosin mixture, kneaded, left to be cooled, solidified and then pulverized. 10 parts of the thus obtained fine powder are mixed with 90 parts of slaked lime in the form of fine powder, thereby producing a powder containing about 2.5% of Ba-salt of pentachlorophenol.

*Example 6.*—According to the methods similar to those shown in the above Examples 1 to 5, the powders containing respectively 2 to 6% of the following salts are obtained:

Ba-salt of tetrachlorophenol
Ba-salt of trichlorophenol
Ba-salt of dichlorophenol
Ba-salt of monochlorophenol
Ba-salt of phenol, and
Ba-salt of 2-chloro-4-phenylphenol

What is claimed is:

1. A photosensitive stable fungicidal powder composition for agricultural use consisting essentially of between 1.0 and 3% by weight of a barium salt of phenol selected from the group consisting of the barium salt of a phenol, the barium salt of monochlorophenol, the barium salt of dichlorophenol, the barium salt of trichlorophenol, the barium salt of tetrachlorophenol, the barium salt of pentachlorophenol and the barium salt of 2-chloro-4-phenylphenol, a mixture of rosin and 10 to 60% rosin saponified with sodium carbonate in an amount between 0.5 and 5 times by weight of the Ba-salt, and a carrier consisting essentially of slaked lime.

2. A composition as claimed in claim 1 wherein said Ba-salt is the Ba-salt of pentachlorophenol, said mixture of rosin and rosin alkali soap being present in an amount of between 1.5 to 9% by weight and the carrier being present in an amount of between 88 to 97.5% by weight.

3. A composition as claimed in claim 1 wherein said mixture of rosin and rosin alkali soap is present in an amount by weight between 1.5 and 3 times the Ba-salt.

4. A composition as claimed in claim 1 wherein said slaked lime is present in an amount of about 90% in the carrier.

References Cited

UNITED STATES PATENTS 2,376,499     5/1945     Mosher _____ 252—367

ALBERT T. MEYERS, Primary Examiner

D. R. MAHANAND, Assistant Examiner

U.S. Cl. X.R.

71—122; 252—107; 424—347